United States Patent [19]

Musgrave

[11] Patent Number: 5,297,513
[45] Date of Patent: Mar. 29, 1994

[54] BREEDING TANK ASSEMBLY FOR FISH LARVAE

[76] Inventor: Gary Musgrave, 267 27th St., San Francisco, Calif. 94131

[21] Appl. No.: 898,062

[22] Filed: Jun. 12, 1992

[51] Int. Cl.⁵ .............................. 119 259; A01K 63/00
[52] U.S. Cl. .................................................. 119/252
[58] Field of Search ................................ 119/2, 3, 4, 5

[56] References Cited

U.S. PATENT DOCUMENTS

| | | | |
|---|---|---|---|
| 3,216,395 | 11/1965 | Girard | 119/5 |
| 3,540,414 | 11/1970 | Maloney | 119/2 |
| 3,584,602 | 6/1971 | Stasio | 119/3 |
| 3,651,785 | 3/1972 | Quinn | 119/5 |
| 3,685,489 | 8/1972 | Day et al. | 119/2 |
| 3,696,788 | 10/1972 | Day et al. | 119/2 |
| 3,900,004 | 8/1975 | Goldman et al. | 119/3 |
| 3,903,844 | 9/1975 | Greenia | 119/5 |
| 3,921,583 | 11/1975 | De Shores | 119/5 |
| 3,967,585 | 7/1976 | Monaco | 119/2 |
| 3,991,715 | 11/1976 | Gibson | 119/5 |
| 4,249,480 | 2/1981 | Dugan . | |
| 4,501,227 | 2/1985 | Dugan et al. | 119/2 |
| 4,711,199 | 12/1987 | Hyman | 119/3 |
| 4,738,220 | 4/1988 | Ewald | 119/2 |

FOREIGN PATENT DOCUMENTS

1282834  1/1987  U.S.S.R. .................. 119/3

*Primary Examiner*—John G. Weiss
*Attorney, Agent, or Firm*—Townsend and Townsend Khourie and Crew

[57] ABSTRACT

An improved tank assembly comprising a number of tanks. One of tanks holds the parent fish and has structure for allowing fish larvae to flow into another tank. In the second tank, the fish larvae can circulate and continue to grow. Food is circulated in the tank assembly, and the food particles are collected and prevented from draining out of the tank assembly. The second tank is preferably a circular tank and, once the larvae are in the circular tank, the water current can be adjusted to meet the needs of the fish. This is achieved by an air lift tube carried by the circular tank. The air lift tube operates to exchange water periodically in the circular tank. The air lift tube also pumps live food into the circular tank.

13 Claims, 6 Drawing Sheets

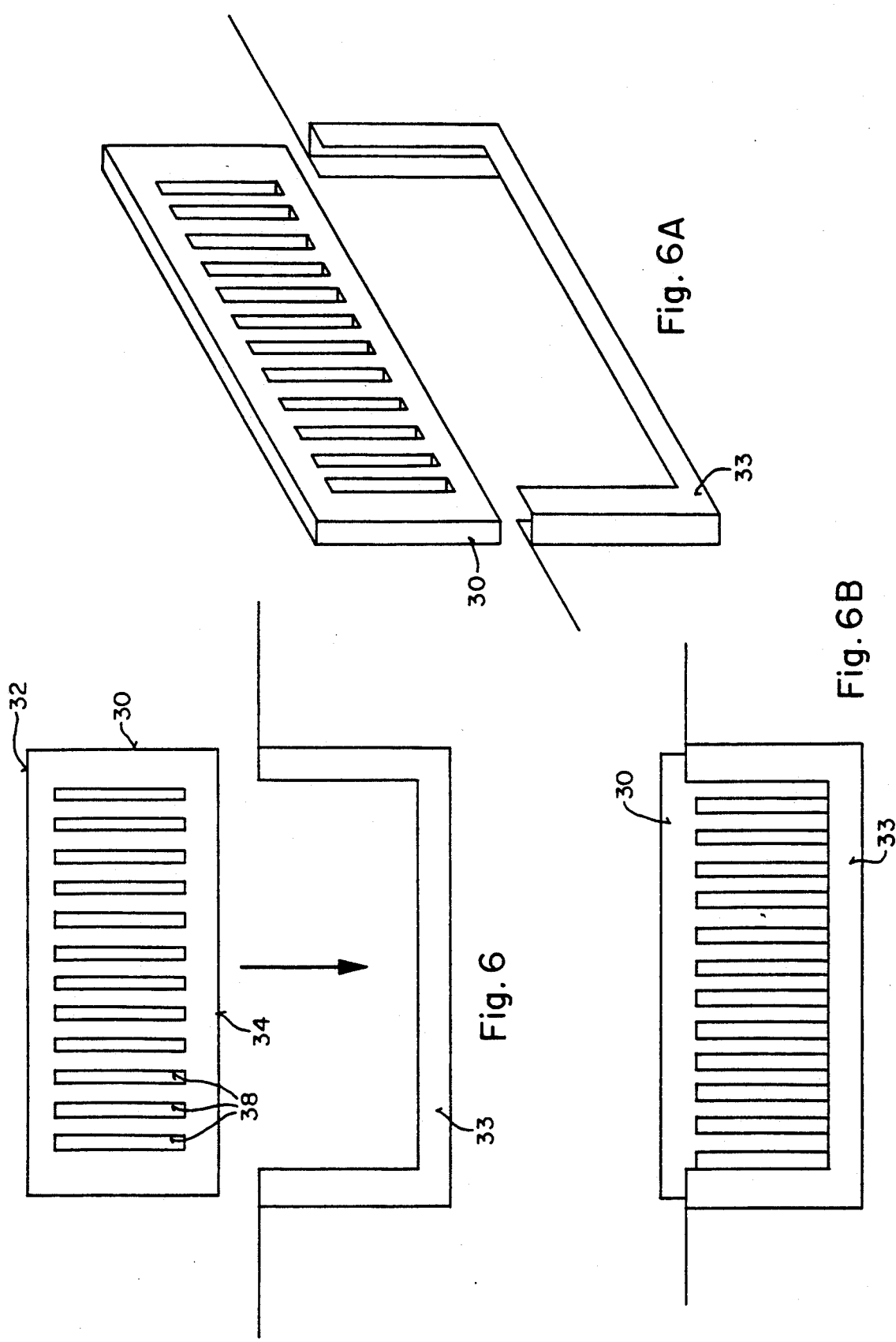

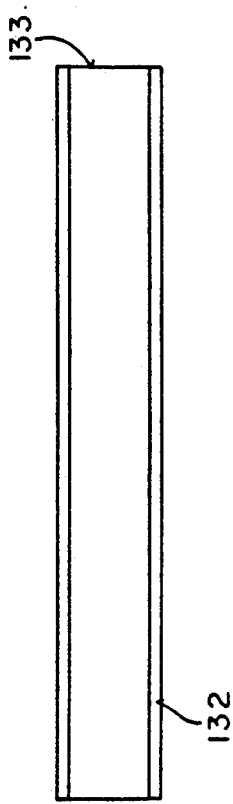
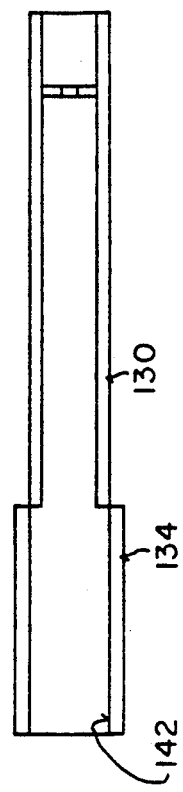
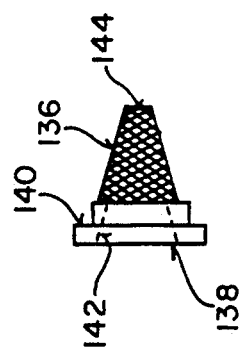
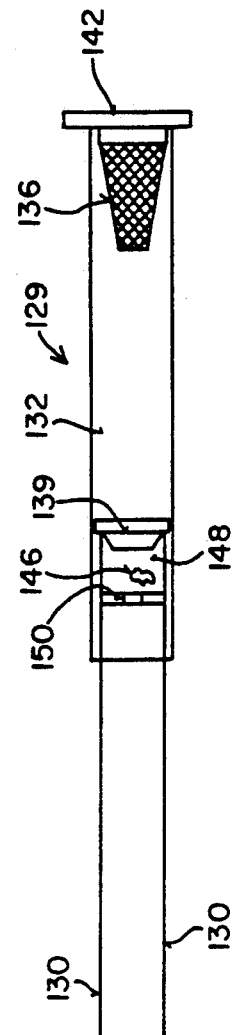
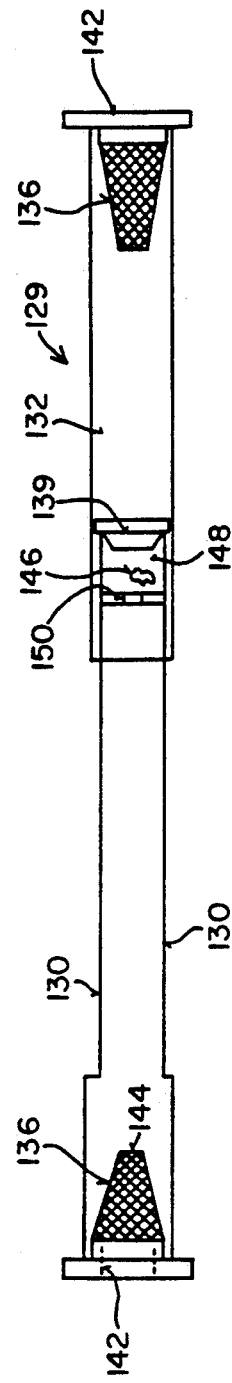
Fig. 9
Fig. 8
Fig. 12
Fig. 11
Fig. 10
Fig. 7

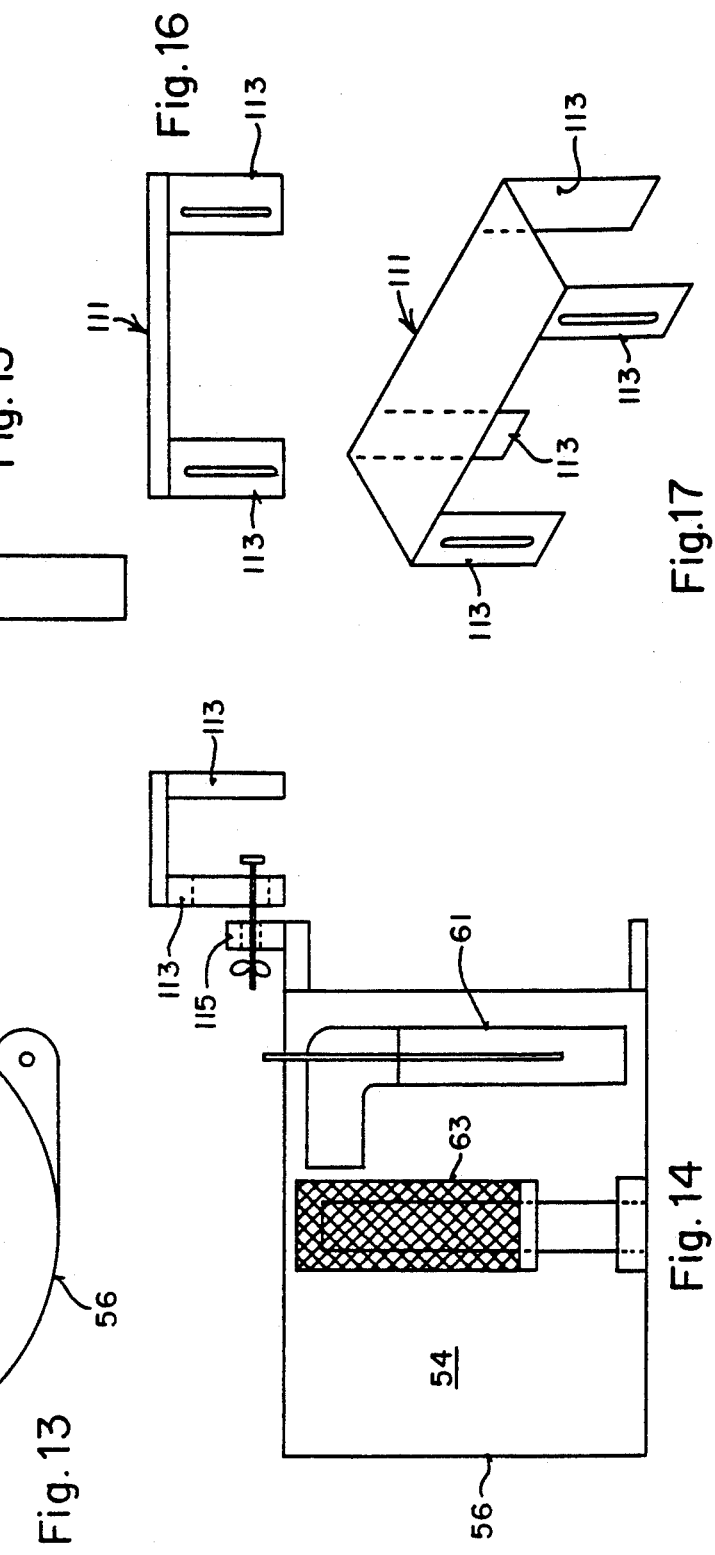
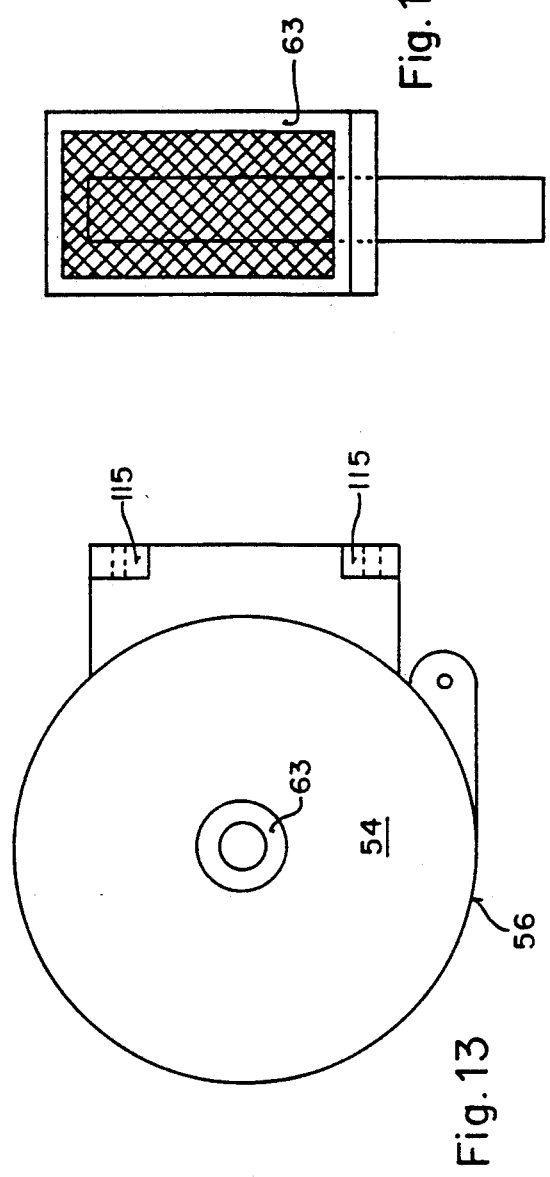

BREEDING TANK ASSEMBLY FOR FISH LARVAE

This invention relates to improvements in the housing of fish, both salt water fish and fresh fish, and more particularly, to a tank assembly for use in holding fish for the first few weeks of life.

BACKGROUND OF THE INVENTION

In the hatching of fish, it is well to move the fish larvae as soon as practicable out of the tank which contains the pair of fish for hatching purposes. The reason for this is that the parent fish will eat the larvae. Thus, there will be a big reduction in the yield from the hatch.

Most breeding tanks used for the birthing of fish larvae are complex for one or more reasons and are not efficient in separating the larvae from the parent fish. Thus, a need exists for improvements in the handling of fish larvae in a water tank immediately after hatching of the larvae. The aim is to assure a high yield of fish in the larvae states without manually handling the larvae. The present invention satisfies this need for an improved tank system for handling fish larvae at birth.

SUMMARY OF THE INVENTION

The present invention provides an improved tank assembly comprising a number of tanks arranged in a fashion such that water is continuously circulated through the various tanks yet one of the tanks holding the parent fish has means for allowing fish larvae to flow into another tank so as to become free of the parent fish. In the second tank, the fish larvae can circulate and continue to grow without interference from the parent fish. Food is circulated in the tank assembly, and the food particles are collected and prevented from draining out of the tank assembly so as to be retrieved for re-use without substantial loss of the food particles.

With the tank assembly of the present invention, fish can be raised from hatching to maturity without being handled by an attendant. Moreover, fish larvae can be transferred into a second tank from a first tank without the need for operator attention. The second tank is preferably a circular tank and, once in the circular tank, the water current can be adjusted to meet the needs of the fish, such as a slow current or a fast current. This is achieved by means of an air lift tube carried by the circular tank. The air lift tube operates to exchange water periodically, such as 24 hours per day, in the circular tank. The air lift tube also pumps live food into the circular tank.

The assembly of the present invention includes a structure to keep water quality in the assembly at a high standard. Such structure includes a filter, protein skimmers and other equipment for this particular purpose. With the assembly of the present invention, once the larvae have grown large enough, they can be released directly into an aquarium for future growth. Food collectors can save and retrieve the life food for re-use. Thus, the food cannot thereby be pulled into a filter and wasted. Moreover, the assembly of the present invention includes water gates of improved construction to control the level of water in the tank. By controlling the water level in the tank, the transfer of the larvae into a second tank from the first tank can be controlled and orchestrated.

Prior U.S. patents relating to this general subject matter are as follows: U.S. Pat. Nos. 3,967,585, 3,661,119, 4,249,480, 3,216,395, 3,921,583, 3,991,715, 3,651,785, 3,903,844, 3,288,110, 3,900,004, 3,584,602.

The primary object of the present invention is to provide an improved tank assembly for breeding fish larvae hatched in one tank containing the parent fish so that the larvae can travel with water currents to a second tank and be isolated from the parent fish during growth yet water can circulate through the various tanks of the assembly to transfer food to the fish in a circulatory manner to assure that the food will not be wasted yet the hatching and growth of the fish larvae can be achieved without operator attention in an efficient manner to provide a high yield of fish from the larvae.

Other objects of this invention will become apparent as the following specification progresses, reference being had to the accompanying drawings for an illustration of the invention.

DESCRIPTION OF THE DRAWINGS

FIGS. 6, 6A and 6B are views of the overflow water gates of the system;

FIG. 7 is a schematic side elevational view of a worm trap forming another aspect of the present invention;

FIGS. 8 and 9 are views similar to FIG. 7 showing the telescoping tubes of the worm trap;

FIGS. 10, 11 and 12 are side elevational views of the trap and end walls of one tube of the worm trap of FIG. 7;

FIGS. 13 and 14 are top and side views of the larvae tank of the assembly;

FIG. 15 is an elevational view of a particle collector in the larvae tank of FIGS. 13 and 14; and FIGS. 16 and 17 are views of a support to which the larvae tank is coupled.

DESCRIPTION OF SPECIFIC EMBODIMENTS

Figure 1:
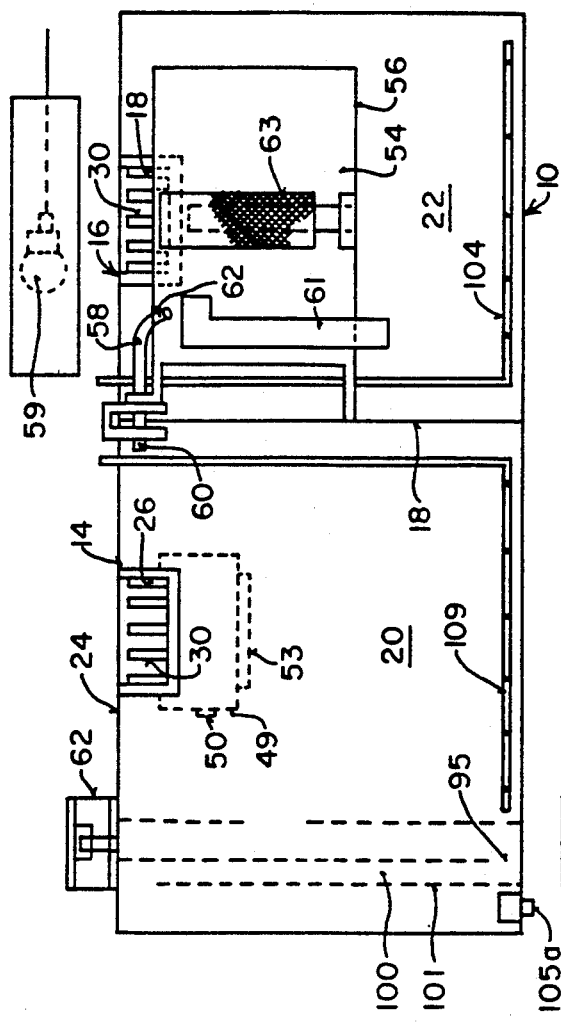
FIG. 1 is a front view of the breeding tank assembly of the present invention showing a large tank for the birthing of fish and a smaller tank for fish larvae adjacent to the birthing tank.
Figure 3:
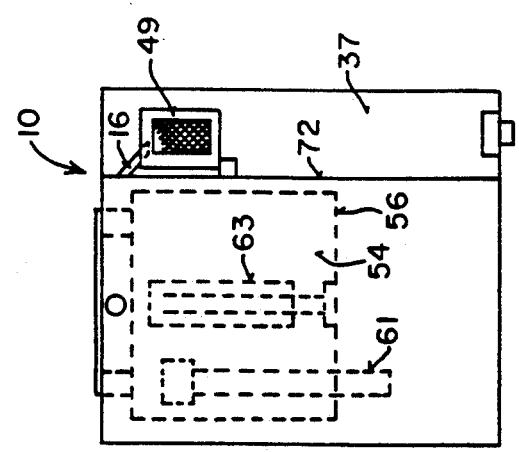
FIG. 3 is a side elevational view of the assembly of FIGS. 1 and 2.
Figure 2:
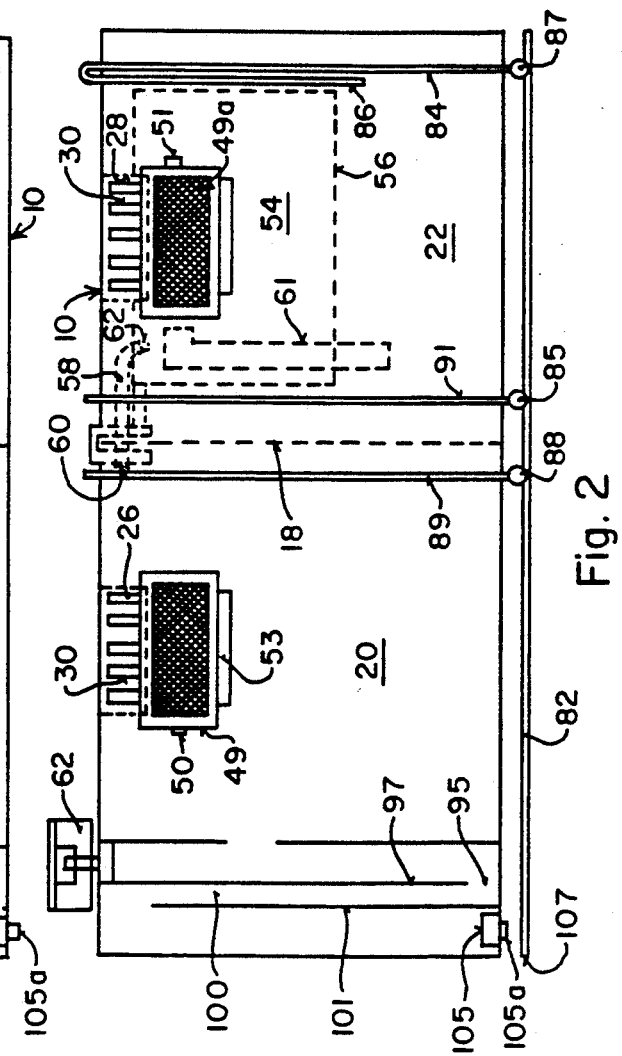
FIG. 2 is a rear view of the tank assembly and showing a pair of water gates.

The fish breeding tank assembly of the present invention is broadly denoted by the numeral 10 and is shown in FIGS. 1, 2 and 3. Assembly 10 includes a pair of tanks 14 and 16 which are interconnected by an imperforate wall 18 so as to form two tank chambers 20 and 22. The upper edge 24 of tank assembly 10 has a pair of side openings 26 and 28 covered by overflow water gates 30 which are shown in greater detail as to their mounting in FIGS. 6, 6A and 6B.

Gate 30 is a rectangular plate having upper and lower edges 33 and 34 and a plurality of elongated, relatively long slots 38 extending between upper and lower edges 33 and 34. Brackets 33 are used to mount gates 30 on tank assembly 10.

A food and debris collector screen 49 is adjustably mounted by means 50 of any suitable construction, such as bolt and bracket means, on the outside of chamber 20 and in a small rear chamber 37 (FIG. 3) in partial covering relationship to the slots 38 of adjacent plate 30. A food collector bracket 53 is on the lower end of bracket collector 49. Similarly, a food and debris collector 49a is adjustably mounted in chamber 37 by means 51 in partial covering relationship to slots 38 of plate 30.

A circular rearing chamber 54 is formed by a tank 56 within chamber 22 as shown in FIG. 1. Tank 56 is placed in fluid communication with chamber 20 by a tube 58 which has a first, upstream end 60 open to chamber 20 and a second, downstream end 62 open to chamber 22. The fish larvae from chamber 20 pass through tube 58 with water overflow from chamber 20 to chamber 22. The water overflow is caused by adjusting the height of gate 30 with respect to the water level (FIG. 2). When the upper edge of collector 49 is lowered so that it is at the same horizontal level as inlet 60 of pipe 58, water flows into the pipe 58 through outlet end 62 and into chamber 54 which also contains an air lift tube 61 and a drain tube 63 and a water skimmer 62. Tube 63 is in fluid communication with chamber 22.

Outer rear chamber 37 (FIG. 3) is defined by inner wall 72 which is perpendicular to wall 18. A water chute 76 channels water from slots 38 into chamber 37.

Figure 5:
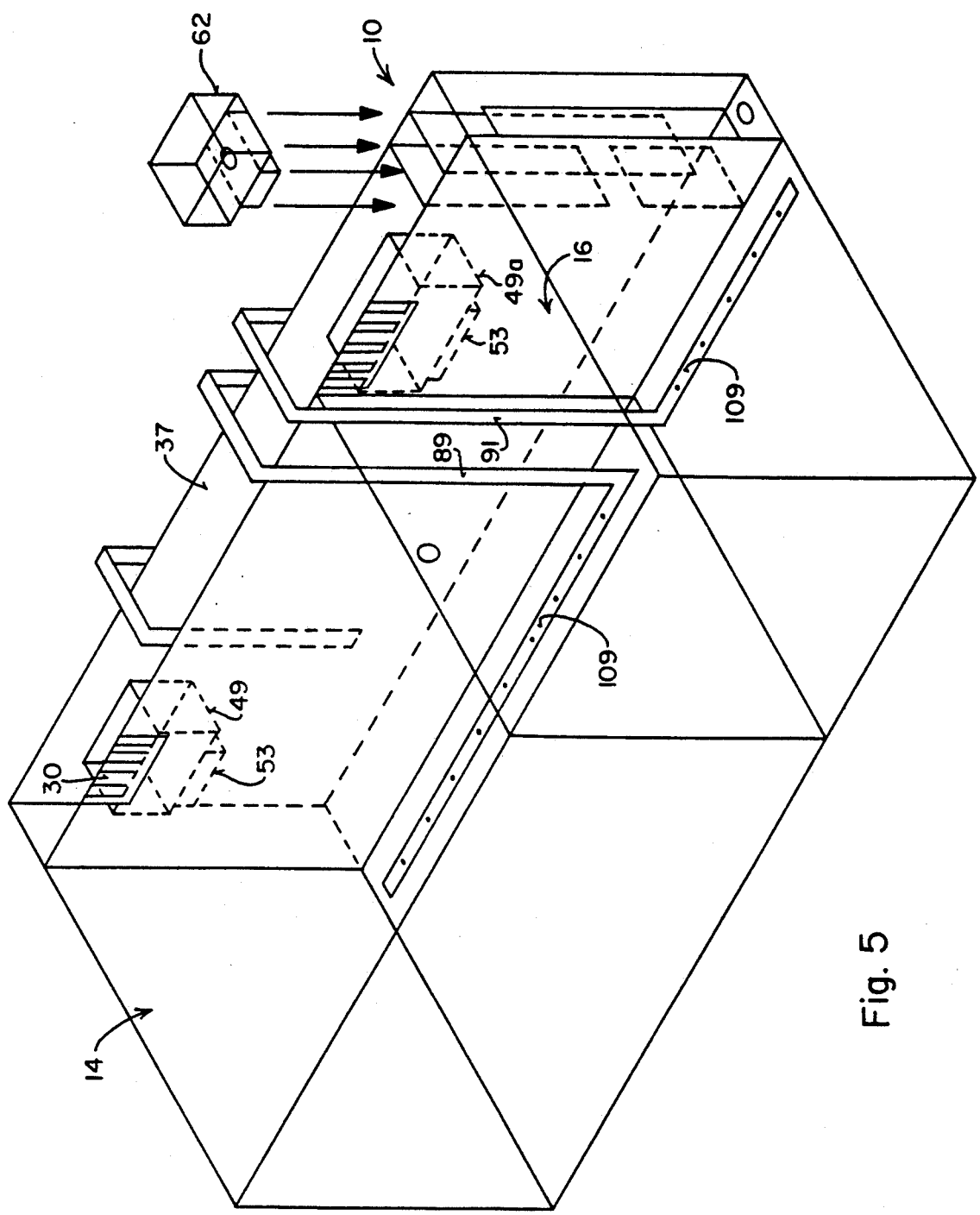
FIG. 5 is a perspective view of the assembly but showing the fluid flow pipes through the system.

From a filter, water flows through a horizontal inlet tube 82 (FIG. 5) and then up through a vertical tube 84 and then back down into a parallel tube segment 86 which has an open end in chamber 22.

Water circulation through the system is as follows:

The water enters inlet 107 of manifold 82 (FIG. 4) and passes through check valves 83, 85 and 87. A water line 89 coupled with valve 83 directs water into chamber 20 (FIG. 1). A water line 91 coupled with valve 85 directs water into chamber 22. Pipe 84 (FIG. 5) is coupled with valve 87 and directs water into a rear compartment 37 (FIG. 3) where the water flows as indicated by arrows 93 to an opening 95 below a fixed plate 97 secured to and depending from the top 99 covering chamber 20.

The water flow passing under plate 97 flows through a passage 100 formed by plate 97 and a second plate 101. The flow is then over the top edge of plate 101 and downwardly through a drain pipe 103 whose outlet 105 is coupled to a filter (not shown). Water from the filter is fed into the inlet 107 of manifold 82, and the process is repeated.

Figure 4:
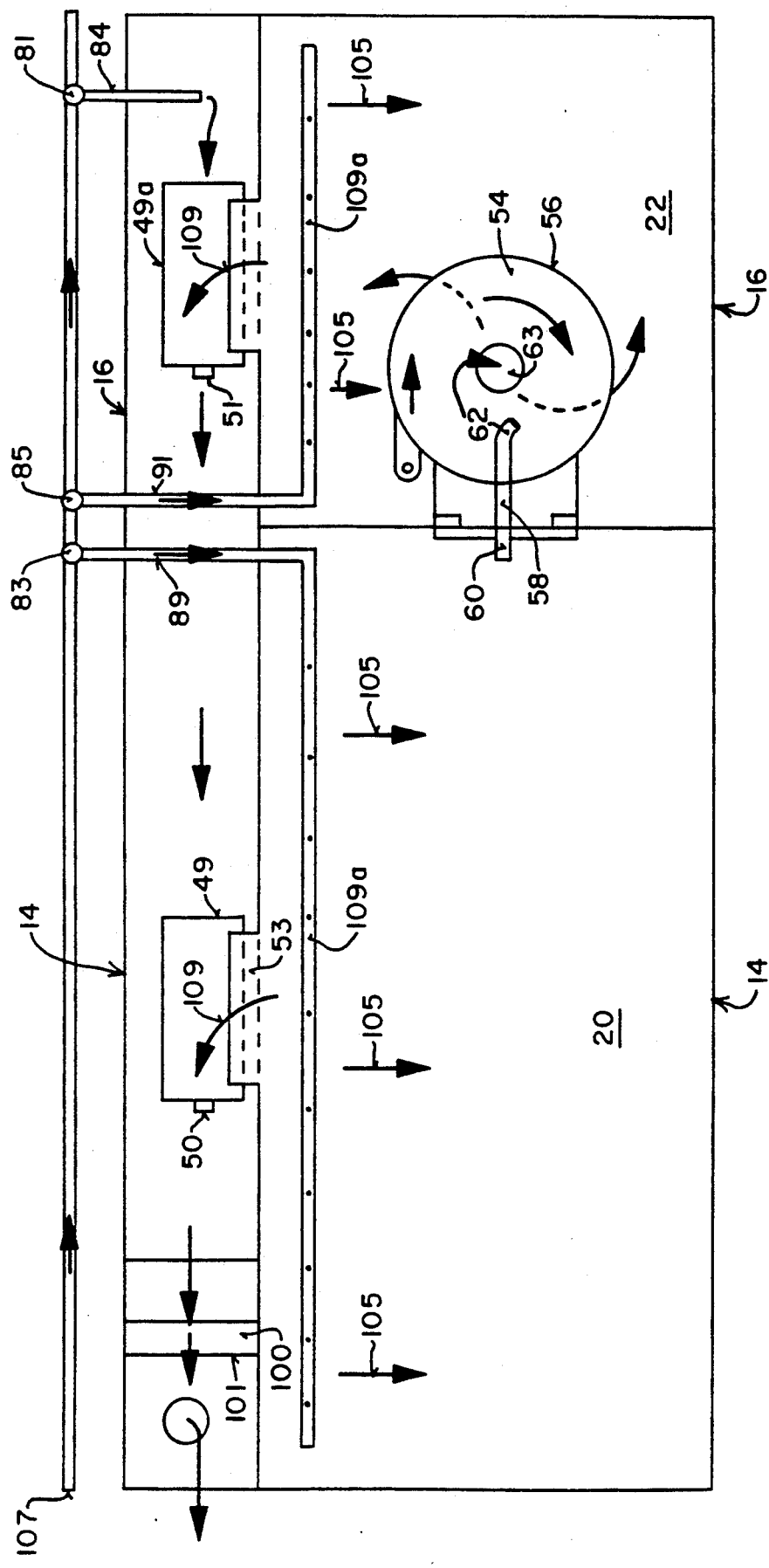
FIG. 4 is a top plan view of the assembly of FIGS. 1-3.

The movement of the water from pipes 109a across the bottoms of the tanks 20 and 22 is denoted by the numeral 105 as shown in FIG. 4. Spray bars 107 are shown in FIG. 4 as are the fluid flow lines with arrows to indicate the flow of water along the bottom of the tanks. The spray bars 107 keep debris from settling on the bottom.

A major portion of the water flow passes inwardly and outwardly of chambers 20 and 22 and into chamber 37 (FIG. 3), the water flow being through food particle collectors 49 and 49a.

Water flow out of the chambers 20 and 22 is through particle collectors 49 and 49a and the water flow through the collectors is indicated by the numeral 109 (FIG. 4). The water flow is then through chamber 37 to the left when viewing FIG. 4, and the water flow flows downwardly along the right hand surface of plate 97 (FIG. 5) to opening 95 and up and down through tube 103 to an outlet 105.

System 10 comprises a two-chamber breeding and rearing assembly for marine fish with a removable circular larvae rearing chamber 54. System 10 can also be used for breeding freshwater fish.

Chamber 20 is used for the egg-laying pair of parent fish. Chamber 22 is used for the later growth of the larvae and tank 56 is used for early growth of the larvae. Overhead lights 59 are provided and can be adjusted with timers so that the smaller chamber 54 associated with tank 56 will have its lights on in the evening and during the nighttime to attract the larvae.

Overflow gates 30 are designed to raise or lower the water level simply by changing gates or by raising or lowering the positions of the gates. The transfer tube 58 is made of clear plastic and adjustably connects the two chambers 20 and 54 with each other. At night, transfer tube 58 creates a luminous effect due to lights 59 so that it attracts the larvae in chamber 20. Transfer tube 58 is also used to transfer the larvae from the pair chamber 20 and to be below the overflow gate 30 to cause water flow through tube 58. By setting the overflow gate so that it raises the water level, the water starts to flow from the chamber 20 into chamber 54 of the larvae tank. This transfer can be done without having to be present when a hatch takes place. Water which overflows chamber 54 through tube 58 (FIG. 1) will flow into chamber 22.

Once the larvae has been transferred to the tank 56 then transfer tube 58 can be removed and the water gates 30 can be returned to their standard operating positions.

The water current in chamber 54 is regulated by the air lift tube 61. With the tube 61, air lifts exchange water from the larvae tank 56 which in turn is being exchanged to the filtration system. The water exits the tank 56 through the drain tube 62 and recirculates back into the larvae compartment. When a large amount of microscopic food is placed in the larvae compartments 20, 22 and 54, the food is passed through chamber 54 along with the water via the air lift tube 61.

Instead of many small feedings per day, the system 10 allows for one large feeding. Some of the food will be drained off toward the filter area. These are collected in the food and debris collectors 49 and 49a. When water and food exit the compartments 20 and 22, the water and food falls through a water chute 76 (FIG. 3). The water and debris fall into a collector 49 which is a plastic box with fine screen on all four sides. This box is held in place with the water chute 76 and bracket 53. This not only stops the live food from being pulled into the filter, it also keeps the food alive for re-use.

The pre-filtered water travels out through the rear panel through chamber 20 and out of the tank assembly 10 through a drain tube 103. The water can be sent through a filter (not shown). Once the early stages of larvae growth appear large enough, the larvae can be released into the chamber 22 or the chamber 54 can be lifted out of chamber 22 and the larvae can be released into another tank.

FIG. 14 shows a support 111 with slotted legs 113 for adjustably attaching tank 58 on tank 14. Ears 115 are on tank 56 to adjustably receive screws 117 extending through the slots of an adjacent pair of legs 113. Thus, the height of tank 56 can be adjusted relative to tanks 14 and 16.

A worm 129 trap as shown in FIGS. 7–10 includes a pair of open end tubes 130 and 132 (FIGS. 8 and 9). Tube 130 has a sleeve 134 at one end for receiving a conical screen element 136 (FIG. 10) having an annular end member 138 (FIG. 10) coupled thereto. End member 138 has a central hole 142, and element 136 has a small diameter open end 144. Thus, a worm can crawl into tube 130 from either end when the tubes 130 and 132 are telescopically connected together as shown in FIG. 7.

Tube 132 can have a stopper 133 at the outer end as shown in FIG. 9. In the alternative, tube 132 (preferably) can have a conical screen element 136 as shown in FIG. 7.

A worm can sense the presence of a morsel of food 146 in a chamber 148 formed by an annular end wall 150 on the inner end of tube 130. Another annular end wall 139 is within tube 130 and blocks the exit of food morsel 146 from leaving chamber 148. The food morsel 146 could be a piece of shrimp.

Worm trap 128 is assembled by first placing conical elements 136 in the ends of telescoped tubes 130 and 132. Then, walls 150 and 139 are placed in tube 130 after a morsel 146 of food is placed in the space 148 between end walls 139 and 150. Then, the worm trap is placed in the water of a fish tank, such as in chamber 20 or chamber 22 of assembly 10. Worms in the tanks are attracted by the morsel of food 146. The worms will move into and through an element 136 and be trapped in the corresponding tube 130 or 132. The hole 144 is too small for the worm to find and crawl out of, and the worm is trapped and can be taken out of the tank by lifting the worm trap out of the trap itself and then opening the worm trap by removing a conical element 136 or by separating tubes 130 and 132.

What is claimed is:

1. Tank assembly for breeding fish comprising:
   a first tank having an upper edge;
   a second tank in a location adjacent to the first tank;
   a third tank in the second tank, said third tank being near the location;
   water transfer means near the upper edge of the first tank for directing water from the first tank into the third tank;
   adjustable overflow means for adjusting the level of the water in the first tank for flow of the water and thereby fish larvae from the first tank into the third tank;
   means for circulating water through the first, second and third tanks; and
   means for trapping food particles circulating in in the tanks.

2. An assembly as set forth in claim 1, wherein said transfer means includes an open ended transfer tube having an inlet end and an outlet end, the inlet end being in communication with the first tank and the outlet end being in fluid communication with the third tank.

3. An assembly as set forth in claim 2, includes a light means for illuminating the transfer tube to attract fish larvae to the tube for flow through the tube into the third tank from the first tank.

4. An assembly as set forth in claim 1, wherein said third tank includes a drain tube and water skimmer.

5. An assembly as set forth in claim 1, wherein said third tank has an air lift tube therewithin.

6. An assembly as set forth in claim 5, wherein said third tank has a drain tube and a water skimmer.

7. An assembly as set forth in claim 1, wherein said overflow means includes a water gate having a plurality of spaced vertical slots therein, and a food and debris collector adjustably mounted on the first tank in partial covering relationship to the slots of the gate.

8. An assembly as set forth in claim 7, wherein said collector includes a wire screen, and means for adjustably mounting the wire screen on a wall of the first tank.

9. An assembly as set forth in claim 1, wherein said second tank has an upper edge, said third tank having an upper edge spaced below the upper edge of the second tank.

10. An assembly as set forth in claim 1, wherein said second tank has an upper edge, said overflow means including an opening in the second tank near the upper edge thereof, a water gate having vertical slots therein across the opening, and a food and debris collector in partial covering relationship to the slots of the gate, said collector having means for adjustably mounting the same on the wall of the second tank.

11. An assembly as set forth in claim 1, wherein said assembly includes a tank body having a central partition therein for dividing the assembly and the two tanks, the third tank being in the first tank and spaced above the bottom thereof, the third tank extending laterally from an upper segment of the partition.

12. An assembly as set forth in claim 1, wherein said first, second, and third tanks define first, second, and third chambers, there being a fourth chamber extending along one side margin of the first, second, and third tanks, said fourth chamber being in fluid communication with the first, second, and third chambers and having an overflow pipe for receiving water to be sent to a filter.

13. An assembly as set forth in claim 1, wherein is included water filling manifold means for extending from a source of water to the first and second tanks for filling water in the tanks, and check valve means associated with the water flow to control the direction of flow of water from the manifold to the first and second tanks.

* * * * *